United States Patent [19]

Kay

[11] 4,405,207
[45] Sep. 20, 1983

[54] METHOD OF ASSEMBLING A GRADIENT INDEX LENS ARRAY HAVING REDUCTION PROPERTIES

[75] Inventor: David B. Kay, Rochester, N.Y.

[73] Assignee: Xerox Corporation, Stamford, Conn.

[21] Appl. No.: 224,348

[22] Filed: Jan. 12, 1981

[51] Int. Cl.³ .............................................. G02B 5/16
[52] U.S. Cl. ................... 350/320; 156/154; 156/228; 350/96.25; 350/96.31; 350/413; 350/417
[58] Field of Search ............... 350/96.18, 96.24, 96.25, 350/96.26, 96.27, 96.31, 320, 413, 417, 96.21, 96.22; 355/1; 156/65, 154, 228, 276

[56] References Cited

U.S. PATENT DOCUMENTS

| | | | |
|---|---|---|---|
| 3,658,407 | 4/1972 | Kitano et al. | 350/96.25 |
| 3,947,106 | 3/1976 | Hamaguchi et al. | 355/1 |
| 4,168,900 | 9/1979 | Adachi | 355/1 |
| 4,189,207 | 2/1980 | Fisher et al. | 350/96.25 |
| 4,258,978 | 3/1981 | Cole | 350/96.25 |
| 4,264,130 | 4/1981 | Ogura | 350/96.25 |
| 4,331,380 | 5/1982 | Rees et al. | 350/96.25 |

FOREIGN PATENT DOCUMENTS

| | | | |
|---|---|---|---|
| 1041341 | 10/1978 | Canada | 355/1 |
| 55-28083 | 2/1980 | Japan | |

OTHER PUBLICATIONS

Miller, "A Fiber-Optic-Cable Connector", *Bell Syst. Tech. Journal*, vol. 54, No. 9, Nov. 1975, pp. 1547-1555.

*Primary Examiner*—John D. Lee

[57] ABSTRACT

A method of assembling a plurality of gradient index fibers into a lens array capable of transmitting a reduced or enlarged image is provided. The fibers, in either one or multiple row configuration, are placed between outer binding members. The fibers are aligned in the required fan-like configuration by being seated in grooves formed in the interface surface of one or both of the binding members. The fibers and members are bonded together into a lens array by one of a number of described bonding techniques.

1 Claim, 12 Drawing Figures

METHOD OF ASSEMBLING A GRADIENT INDEX LENS ARRAY HAVING REDUCTION PROPERTIES

The present invention relates to gradient index optical fibers and more particularly to a method of assembling such fibers into a characteristic fan-shaped lens array which is capable of transmitting an image of an object at an object plane to an image plane at a magnification other than unity.

As known in the art, gradient index optical fibers, of the type disclosed in U.S. Pat. No. 3,658,407, have been used to transmit images from an object plane to an image plane at a unity magnification. In U.S. Pat. No. 4,331,380, issued on May 25, 1982 and assigned to the same assignee as the present invention, there is disclosed a novel gradient index lens array which is capable of transmitting images from an object to an image plane at magnification other than unity, i.e. at reduced or enlarged magnifications. This multi-magnification function is achieved by arranging the gradient index fibers in a characteristic fanfold assembly having parameters and specifications disclosed in the aforementioned patent whose contents are hereby incorporated by reference.

In the known 1:1 prior art arrays, the lens array has generally been of a "bundled" configuration wherein two or more rows of gradient index fibers are assembled in an alternate staggered configuration. The fibers are then fixed in a final mutually parallel position by introduction of a resin or epoxy material between and around the fibers. In the novel lens array disclosed in the aforementioned application, the arrays may comprise either single or multiple rows of fibers, each fiber having a specific non-parallel orientation vis-a-vis the other fibers. The prior art techniques for the assembly of unity magnification lenses are therefore not suitable for assembling the multi-magnification lens arrays.

The present invention is therefore directed towards methods for assembling a gradient index lens array having a magnification other than unity. This is accomplished in a first method by the steps of determining the relative orientation of said fibers with respect to each other and with respect to the object and image planes, said orientation resulting in a fan-fold type configuration of said fibers, providing a first binding member having a plurality of grooves, each groove adapted to accommodate one of said fibers, said grooves formed so as to seat each fiber in the previously determined relative orientations, adhesively seating the optical fibers into the grooves, and bonding said first member to a second member to form said lens array.

DRAWINGS

Figure 1:
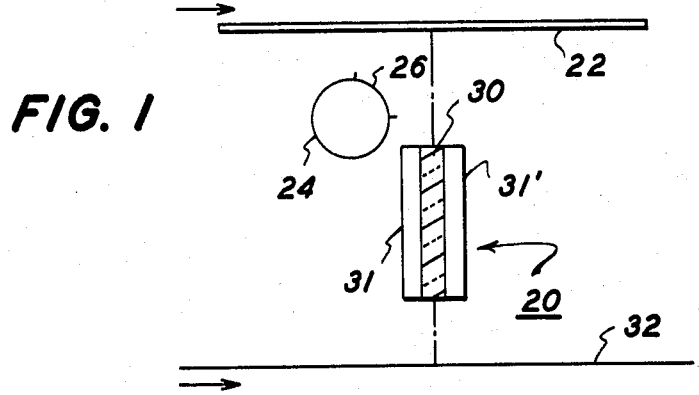
FIGS. 1 and 2 show an end and frontal view, respectively, of a gradient index reduction lens array in an imaging system.
Figure 2:
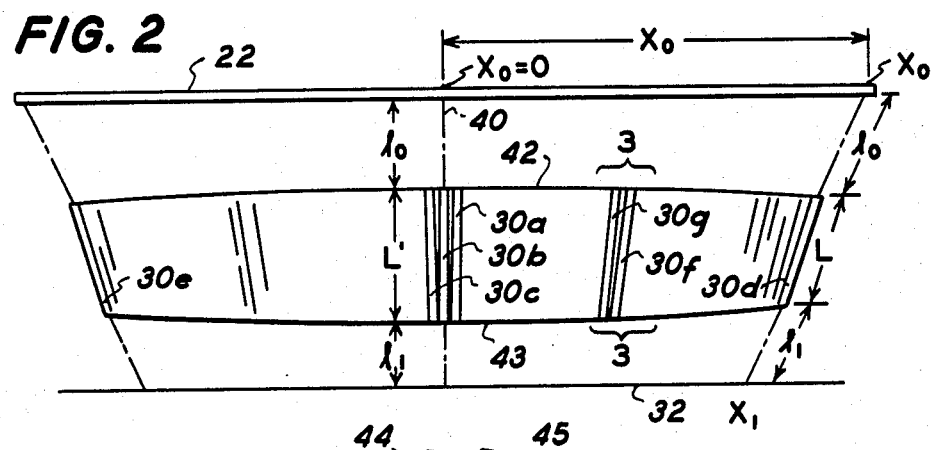

In order to appreciate what is required to assemble the reduction or enlargement lens arrays disclosed in the aforementioned co-pending application, reference is made to a single row reduction lens array shown in FIGS. 1 and 2.

These figures show, in side and front views respectively, a plurality of gradient index fibers assembled together to form a reduction lens array 20. Referring to FIG. 1, object 22 which can be a document located in an object plane is moved past lens 20 in the indicated direction. Lamp 24 provides intense illumination through an aperture 26 onto successive narrow longitudinal strips of the document. Lens array 20 comprises a single row 30 of optical fibers placed between outer elements 31, 31' and arranged in a manner to be more fully described below. In operation, document 22 is moved past the illuminated area at a speed appropriate to the particular magnification and to the speed of moving imaging plane 32 which can be a photosensitive sheet. Light reflected from document 22 is transmitted by lens array 20 as a reduced image onto sheet 32. The reduced image is formed as a contiguous and overlapping plurality of reduced images from each individual fiber.

Referring to FIG. 2, the arrangement of FIG. 1 is shown in frontal view with the document 22 and image plane 32 traveling into the page. For illustrative purposes, assume that document 22 is an A3 original (width-297 mm) which is to be reduced to A4 size (210 mm), i.e. lens 20 is a 0.707× lens. Lens 20 comprises a plurality of individual gradient index fibers 30a, 30b, 30c, 30d, 30e, . . . which have the same diameter and axial index of refraction and the same index gradient but which differ, each from the other, in length and in orientation of the fiber axis and orientation of their end faces with respect to the object and image planes and in the orientation of their end faces with respect to their axes. As shown, fiber 30a at the center of the array ($X_0=0$) is in vertical orientation, i.e. its axis 40 is perpendicular to the object and image planes which can be a document and a photoreceptor plane, respectively. The axes of adjoining fibers, i.e. 30b, 30c are slightly displaced from the perpendicularity condition, the displacement continuing out to the fibers at the ends of the array. The interfiber displacement value may be a constant value but other values are possible.

Figure 3:
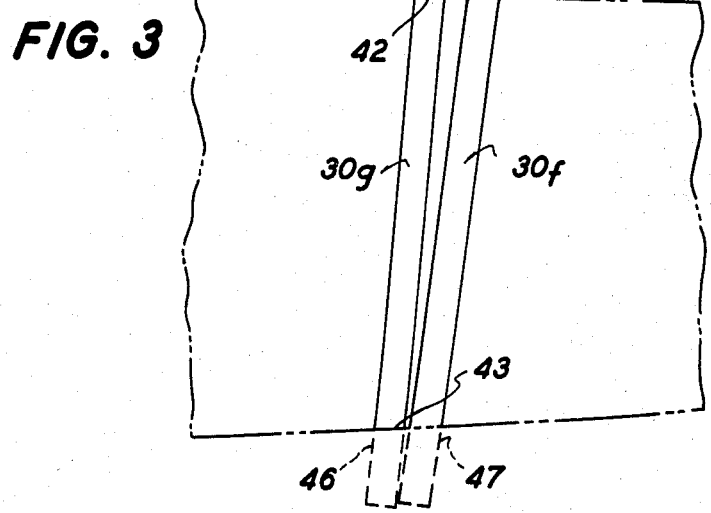
FIG. 3 is an enlarged view of two of the adjoining fibers of the lens array of FIG. 2.

The light ray from the document that passes down the geometrical axis of an endmost fiber 30d (i.e. the central axial light ray for fiber 30d) images document point $X_0=148.5$ mm at the reduced photoreceptor point $X_1=m_0X_0=105.0$ mm, where $m_0$ is the desired magnification (0.707). The relationship $X_1=m_0X_0$ is maintained for the central axial ray passing through each fiber of the array, and the object and image vertex distances ($l_0$, $L_1$) are chosen to provide the correct magnification near the central aixal ray of each fiber. The lens assembly, as a whole, lies in a vertical plane which is perpendicular to the object plane but the lens is comprised of a plurality of fibers with a plurality of axes, each axis forming different angles with respect to a line normal to the object plane. This orientation results in the total conjugate of the light path through each fiber changing from a first value at the center fiber to progressively higher vallues at the endmost fibers. To accomodate this conjugate change, the lengths of the fibers are progressively decreased from the center outward. This can be accomplished by assembling original fibers which are of equal length, the original length being longer than the fiber length determined to be necessary. Once the fibers are assembled, the fiber lengths are shortened to the desired individual lengths by an initial grinding and/or sawing of both faces followed by a polishing process. The end result is the formation of the two smooth convex faces 42, 43. The fibers 30f and 30g are shown in enlarged view in FIG. 3. The dotted portions 44–47 at top and bottom represent portions of the fibers which have been removed during the rough grinding-sawing process. The end faces of the fibers have been polished to smooth surfaces which appear planar but are actually small segments of the convex, and in this example, circular surfaces 42, 43 shown in FIG. 2.

From the above description, it is evident that any method of assembling the fibers must take into account the unique geometry of the array requiring precise angular orientations of each fiber axis with regard to all other fiber axes and with respect to the normal to the object plane. Several methods of assembling the single row array of FIGS. 1 and 2 are shown with reference to FIGS. 4, 5 and 6.

Figure 4:
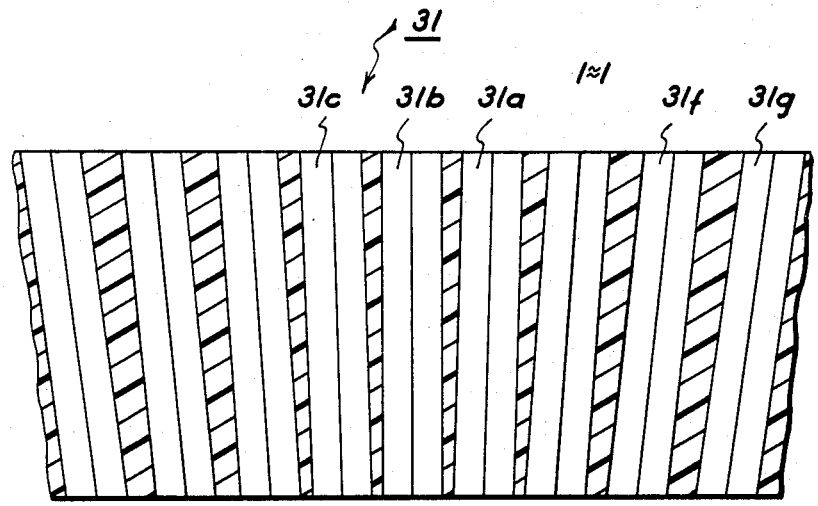
FIG. 4 shows a view of the interface surface of a binding member illustrating the orientation of the fiber-aligning grooves for a single row array.
Figure 5:
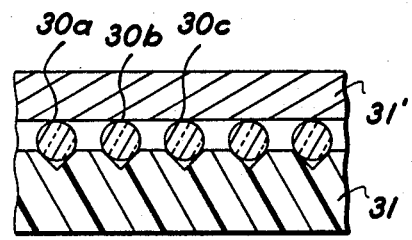
FIG. 5 is a partial top view of the lens array of FIG. 2 utilizing the grooved binding member of FIG. 4.

Referring to FIG. 4, there is shown a first outer member 31 of array 20. Member 31 has a plurality of grooves 31a, 31b, 31c, 31d, 31e . . . milled into the surface of the member. Each groove will seat a corresponding fiber 30a, 30b, 30c, 30 d, 30e . . . so the grooves are precession milled to provide the fan-like geometry shown in FIG. 2. One method of assembly procedure comprises the steps of milling member 31 so as to form grooves which assume the required fan-like geometry. Silicon resin or other adhesive is then sprayed into the grooves. Fibers 30a, 30b, 30c, 30d, 30e . . . are then loaded into the grooves and member 31′, after spraying its bonding surface with the preferred adhesive, is pressed against the seated fibers as shown in FIG. 5. Additional adhesive may be introduced into interstices and the "sandwich" comprising members 31,31′ and fiber row 30 are then clamped into place. If fibers 30 have not been pre-trimmed to exact lengths, the fiber lengths may be formed to the required length by the aforementioned grinding/polishing methods to form convex surface 42, 43.

Figure 6:
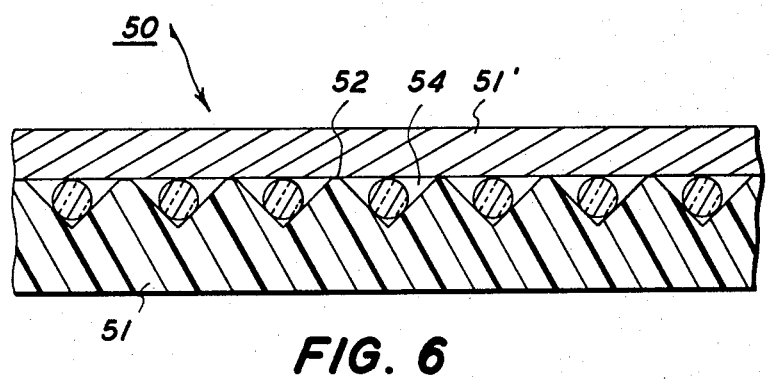
FIG. 6 is a partial top view showing a variation of the grooved binding member of FIG. 5.

FIGS. 4 and 5 are directed to a relatively shallow groove wherein a portion only of the fiber rests within the groove. This configuration permits the rods to be relatively closely packed. For some applications wherein relatively larger inter-fiber spacing can be tolerated, the grooves may be made large enough to completely accomodate the fiber. FIG. 6 shows the end view of an array 50 so constructed. In this embodiment, member 51′ makes binding contact along truncated segments 52 of member 51, the top of each fiber and the resin-filled areas 54.

Figure 7:
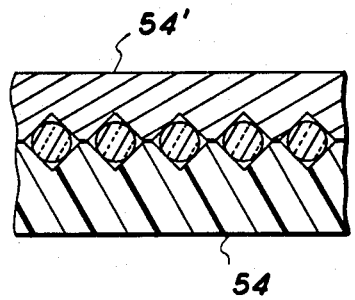
FIG. 7 is a partial top view of another array variation wherein both binding members have grooves which cooperate to align the fibers.

A third assembly method is to mill a matching set of grooves in both outer members 54,54′ as shown in FIG. 7.

Figure 9A:
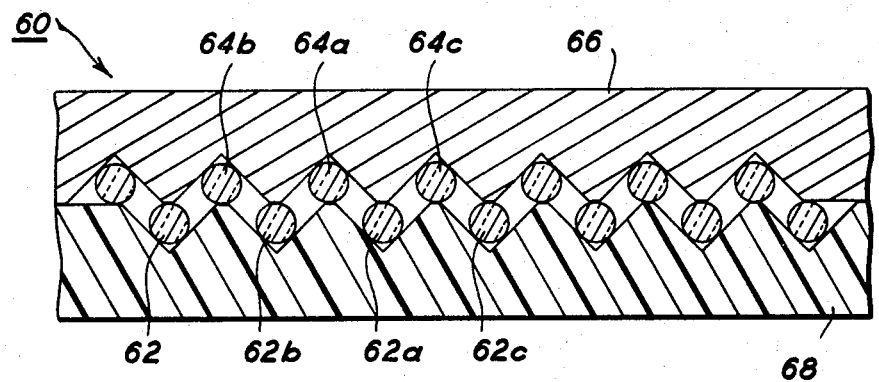
FIGS. 9a and 9b show top views of two variations of grooved binding members which align the fibers in each row in the required orientation.
Figure 8:
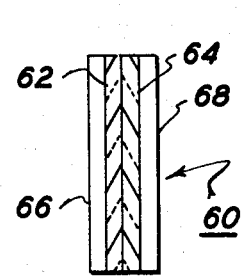
FIG. 8 shows an end view of a two row lens array with parallel fiber rows.

The above methods present several mechanically oriented methods for assembling and aligning single row lens arrays. Similar methods can be utilized in assembling two rows of fibers into a reduction/enlargement lens array as shown in FIG. 8. FIG. 8 shows an array 60 where rows 62, 64 are joined in side by side relationship. FIG. 9a shows a top view of a portion of array 60 wherein members 66 and 68 each contain a plurality of grooves each seating a corresponding fiber, i.e. grooves cut into member 68, seat fibers 62a, 62b, 62c and member 66 seats fibers 64a, 64b, 64c . . . .. Each groove, as in the single row assembly, has been precisely milled so as to seat the associated fiber in the positions required to achieve the fan-like lens array geometry. Following groove making, each member 66, 68 is sprayed with an adhesive, and loaded with the fibers. The loaded members can then be cured separately and then joined together with additional adhesive or joined together immediately and cured.

Figure 9B:
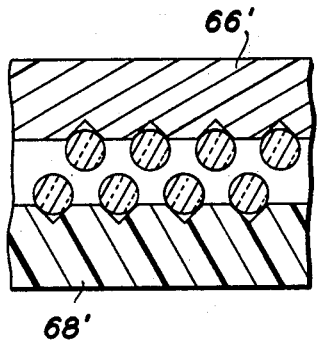

The FIG. 9a configuration illustrates relatively deep grooves which accomodate the entire fiber. FIG. 9b is an alternate embodiment wherein the grooves are shallower serving to increase the packing density. For this embodiment, each loaded member would be cured separately and then joined together.

Figure 10:
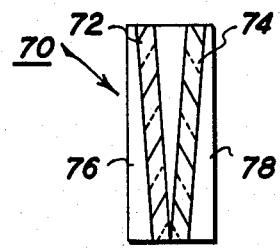
FIG. 10 shows an end view of a two row lens array wherein the fiber rows are tilted.
Figure 11:
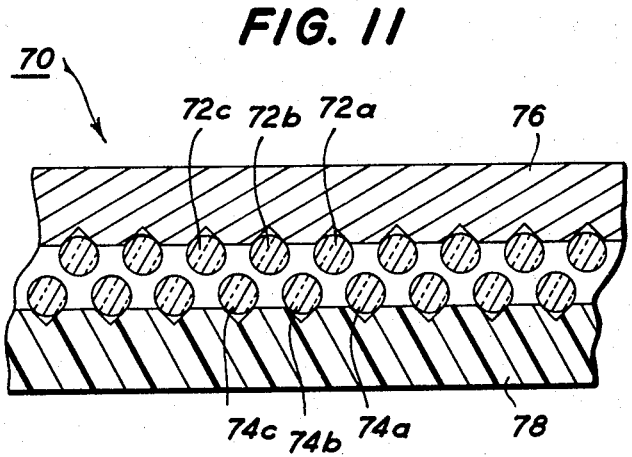
FIG. 11 shows a partial top view of the array of FIG. 10 showing grooves of differing depths to align the fibers in appropriate fashion.

FIG. 10 is an end view of another two row array 70 where rows 72 and 74 are tilted so as to adjoin each other at the imaging face. FIG. 11 shows a top (object side) view of a portion of array 70. Members 76 and 78 each contain the preoriented mill grooves but with the grooves cut progressively deeper from the bottom of the array towards the top. This milling operation can be accomplished, for example, by tilting each member during the groove cutting operation to remove proportionately greater amounts from the member.

The above-described assembling procedures could be modified in several respects without departing from the principles of the invention. For example, although the grooves have been shown as triangular in cross section, they may be any other convenient shape, i.e. curved, which will serve the purpose of cradling and aligning the round fibers. And although each outer binding member has been described in terms of separate milling operation, substrates may also be made by replication or molding techniques well known in the art. For these techniques, a plastic material would be preferred.

What is claimed is:
1. A method of assembling a plurality of gradient index optical fibers into a lens array comprising a first and second row of fibers capable of transmitting an image of an object at an object plane onto an image plane at a magnification other than unity comprising the steps of:

determining the relative orientation and length of said first and second row of fibers with respect to each other and with respect to the object and image planes, said orientation resulting in a fan-fold configuration of said fibers, forming a plurality of grooves in a first generally rectangular binding member, each groove adapted to seat an individual fiber of said first row in their previously determined relative orientations, each groove having a length which increases from the centermost groove out to both ends of the member, forming a plurality of grooves in a second generally rectangular binding member, each groove adapted to seat an individual fiber of said second row in their previously determined relative orientations, each groove having a length which increases from the centermost groove out to both ends of the member, progressively deepening the depth of the grooves on said first and second member in a direction extending from a first of said entrance and exit face of the completed lens to the other face wherein, when said fibers are seated in their respective grooves, said first and second rows are tilted so as to adjoin each other at one face of the array while separated from each other at the other array face placing gradient index optical fibers of approximately equal length into the grooves of said first and second members, the fiber length being such that the fibers extend beyond the ends of the grooves, adhesively seating the optical fibers into the grooves, bonding said first member to said second member to form a lens array, and abrading and polishing the entrance and exit faces of said array so as to reduce the fiber lengths to said predetermined values and to achieve relatively smooth convex entrance and exit faces.

* * * * *